United States Patent [19]

Lennen

[11] Patent Number: 5,721,555
[45] Date of Patent: Feb. 24, 1998

[54] FREQUENCY SPECTRAL LINE TRACKING RECEIVER

[75] Inventor: Gary R. Lennen, San Jose, Calif.

[73] Assignee: Trimble Navigation Limited, Sunnyvale, Calif.

[21] Appl. No.: 358,480

[22] Filed: Dec. 19, 1994

[51] Int. Cl.$^6$ .................................................. G01S 5/02
[52] U.S. Cl. .................................... 342/357; 342/352
[58] Field of Search ............................ 342/357, 352; 455/12.1; 370/70

[56] References Cited

U.S. PATENT DOCUMENTS

| | | | |
|---|---|---|---|
| 5,223,843 | 6/1993 | Hutchinson | 342/352 |
| 5,225,842 | 7/1993 | Brown et al. | 342/357 |
| 5,423,076 | 6/1995 | Westergren et al. | 455/86 |
| 5,457,713 | 10/1995 | Sanderford et al. | 375/206 |
| 5,486,834 | 1/1996 | Lennen | 342/357 |
| 5,504,684 | 4/1996 | Lau et al. | 364/443 |

Primary Examiner—Thomas H. Tarcza
Assistant Examiner—Dao L. Pham
Attorney, Agent, or Firm—Thomas E. Schatzel; Law Offices of Thomas E. Schatzel A Prof. Corporation

[57] ABSTRACT

An improved navigation satellite receiver for tracking individual spread-spectrum frequency spectral lines with a microwave receiver antenna to receive signals from orbiting navigation satellites, a downconverter to produce in-phase and quadrature (I and Q) signals from the received satellite signals, and a digital processing system for frequency and phase locking numeric controlled oscillators (NCO) to the carrier and code of the satellite signals. The improvement comprises at least one spectral line tracker connected to receive the (I and Q) signals and including a spectral line numeric controlled oscillator (NCO) connected to a spectral line mixer that drives a spectral line code correlator. The spectral line NCO is frequency-aided to frequency lock on a spectral line from a value obtained from the carrier NCO.

9 Claims, 5 Drawing Sheets

SPECTRUM FOR GPS P-CODE

SPECTRUM FOR GPS C/A-CODE

FINE SPECTRUM CONTENT OF PRN 1

FINE SPECTRUM CONTENT OF PRN 2

FREQUENCY SPECTRAL LINE TRACKING RECEIVER

BACKGROUND OF THE INVENTION

1. Field of the Invention

The invention relates generally to radio communication and more specifically to navigation receivers that operate with signals received from orbiting navigation satellites.

2. Description of the Prior Art

The USSR, and now Russia, have deployed and support a satellite-based navigation system that is very similar to the global positioning system (GPS) erected by the United States government. The Russian system is called the global orbiting navigation satellite system (GLONASS) and transmits two ranging codes on two separate microwave frequency bands, e.g., "L1" around 1600 MHz and "L2" around 1250 MHz. GPS uses 1575.42 MHz and 1227.6 MHz, respectively. A coarse acquisition (C/A) code is transmitted on L1 and a precision (P) code is transmitted on both L1 and L2, for both systems.

Frequency division multiple access (FDMA) is used by GLONASS for discriminating between each of the orbiting satellite's signals. The GPS uses code division multiple access (CDMA) to sort out signals. There are also fundamental differences in the structure and content of the almanacs and ephemeris information relating to satellite orbit parameters between the two systems. Therefore a GPS navigation receiver is totally incompatible with GLONASS operation and modifications of major fundamental elements of a GPS receiver would be required to adapt it to GLONASS use.

Both GPS and GLONASS use bi-phase shift keyed (BPSK) spread spectrum radio transmissions for both their C/A-code and P-code modulation. For GLONASS, the clock rate is 0.511 MHz for the C/A-code and 5.11 MHz for the P-code, with repetition rates of one kilohertz and one hertz, respectively. For GPS, the clock rate is 1.023 MHz for the C/A-code and 10.23 MHz for the P-code, with repetition rates of one kilohertz and once-a-week, respectively.

FIGS. 1 and 2, respectively, represent the general envelope spectral content of the P-code and C/A-code GPS codes, which are also representative of GLONASS. The spectral content of GPS signals is described more completely by J. J. Spilker, Jr, in "GPS Signal Structure and Performance Characteristics", Navigation, Vol. 1, 1980, pp. 29–54, as published by the Institute of Navigation (Washington, DC.). The detailed characteristics of the spectral content of the GPS signals can be understood by performing a Fourier Transformation across the entire length of each of the C/A and P-codes. As a general rule, the fine spectral structure due to the C/A and P-code BPSK modulation is related to the repetition rate of the respective C/A and P-code. The GPS P-code is very long, and therefore its spectral content is very fine grained, and is, for practical purposes, continuous. The C/A-code is relatively short in length, one millisecond, and its fine spectral structure comprises radio energy in narrow width frequency lines which can be discriminated, as they are one kilohertz apart. There are 1,023 such lines on each side of the carrier frequency (Fc) in the main energy lobe of a GPS radio carrier which has been modulated with the C/A-code.

Each orbiting GPS satellite transmits a unique C/A-code, using different pseudo-random number (PRN) sequences. Each satellite therefore transmits a unique sequence of ones and zeros over its 1,023-bit C/A-code length. The relative spectral line energy distribution is related to the particular PRN being transmitted.

For example, FIGS. 3 and 4 illustrate the difference in energy amplitude distribution for the first and second PRN sequences. Energy phases are also affected in characteristic ways. Each vertical energy amplitude line is one kilohertz from its adjacent lines, and the most energetic can be six to seven decibels stronger in received signal amplitude than the least energetic. Each spectral line, in each of the C/A-codes, has an associated amplitude and phase, $$Sn(t)=An \times \sin(Wn+Pn), \qquad (1)$$

where, $Sn(t)$=spectral content of $n^{th}$ spectral line, $n=0$ is the carrier (Fc), $n=1$ is Fc plus one kilohertz, $n=-1$ is Fc minus one kilohertz;

An=amplitude of the $n^{th}$ spectral line;
Wn=frequency of $n^{th}$ spectral line;
Pn=phase of $n^{th}$ spectral line; and
t=time.

The radio spectrum of a navigation satellite's carrier signal transmission will be affected by various distorting phenomenon, e.g., multi-path and ionospheric effects. The whole collection of energy lines is subject to a group delay that is routinely measured by conventional equipment.

SUMMARY OF THE PRESENT INVENTION

It is therefore an object of the present invention to provide a navigation receiver for measuring the amplitude and phase of constituent spectral lines in radio transmissions from orbiting navigation satellites.

It is a further object of the present invention to provide a navigation receiver that analyzes the amplitude and phase of individual spectral lines of energy in navigation satellite transmissions and corrects channel distortion according to the satellite's unique C/A-code sequence.

It is another object of the present invention to provide a navigation receiver that provides high quality measurements on signals from navigation satellites.

Briefly, an embodiment of the present invention comprises an improved navigation satellite receiver for tracking individual spread-spectrum frequency spectral lines with a microwave receiver antenna to receive signals from orbiting navigation satellites, a downconverter to produce in-phase and quadrature (I and Q) signals from the received satellite signals, and a digital processing system for frequency and phase locking numeric controlled oscillators (NCO) to the carrier and code of the satellite signals. The improvement comprises at least one spectral line tracker connected to receive the (I and Q) signals and including a spectral line numeric controlled oscillator (NCO) connected to a spectral line mixer that drives a spectral line code correlator. The spectral line NCO is frequency-aided to frequency lock on a spectral line from a value obtained from the carrier NCO.

An advantage of the present invention is that a navigation satellite receiver is provided that can measure the amplitude and phase of individual spectral lines of the C/A-code radio carrier.

Another advantage of the present invention is that a navigation satellite receiver is provided that can measure ionospheric distortion with a single radio carrier.

A further advantage of the present invention is that a method is provided for correcting distortions in received signals from orbiting navigation satellites, such as are caused by multipath.

Another advantage of the present invention is that a method is provided for a navigation satellite system receiver to measure spectral lines in parallel, or in series, such that the relative signal distortion, with respect to a known ideal signal, can be measured.

These and other objects and advantages of the present invention will no doubt become obvious to those of ordinary skill in the art after having read the following detailed description of the preferred embodiment which is illustrated in the drawing figures.

THE DRAWINGS

DETAILED DESCRIPTION OF THE PREFERRED EMBODIMENT

Figure 5:
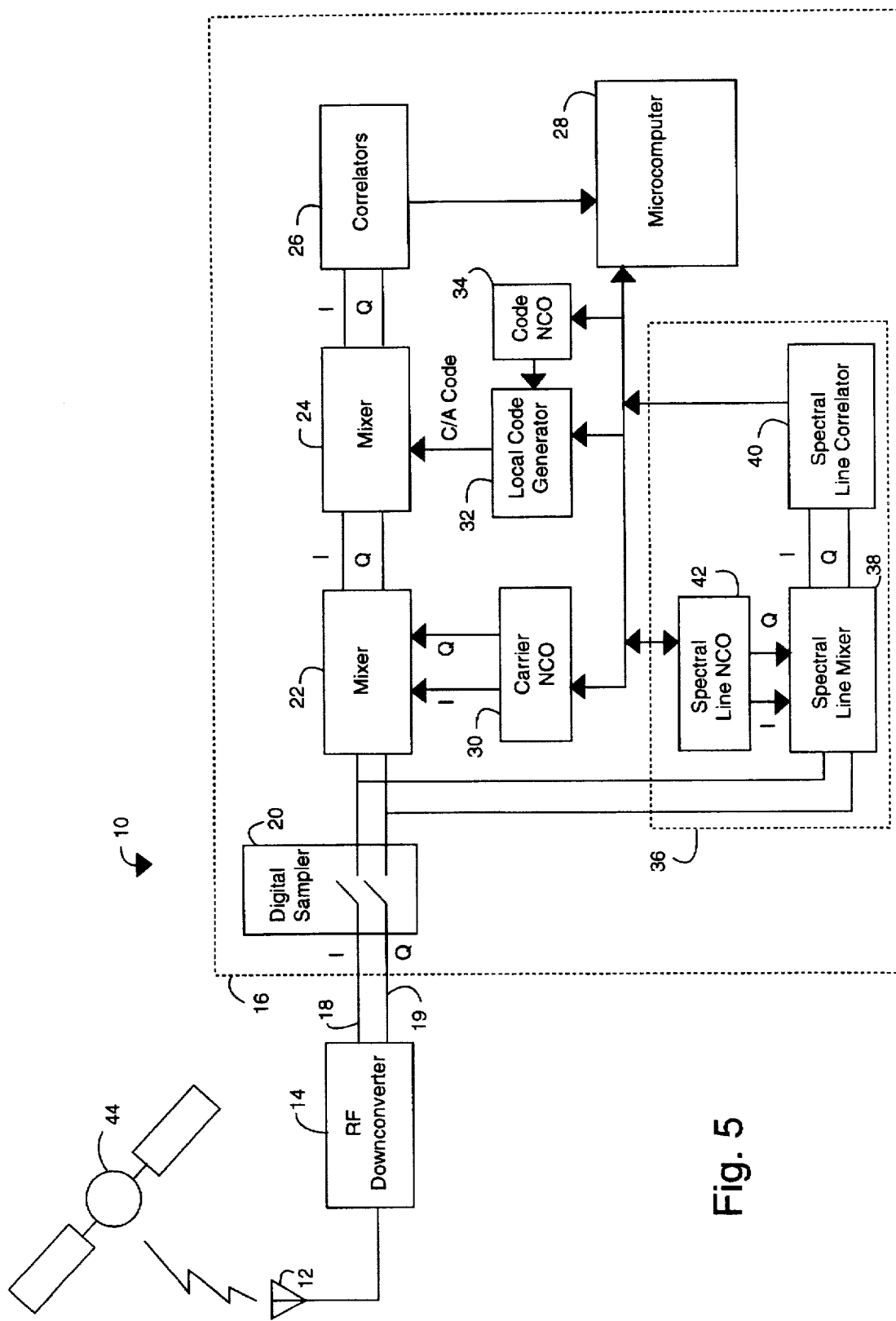
FIG. 5 is a diagram of a navigation satellite receiver embodiment of the present invention.

FIG. 5 illustrates a navigation satellite receiver embodiment of the present invention, referred to by the general reference numeral 10. For example, the receiver 10 operates with satellites in the global orbiting navigation satellite system (GLONASS), as supported by Russia, or the global positioning system (GPS), as supported by the United States. Receiver 10 comprises a microwave patch antenna 12, a radio frequency down converter 14 and a digital section 16. An in-phase (I) signal 18 and a quadrature (Q) signal 19 are output for digital processing by the digital section 16 which includes a digital sampler 20, a first mixer 22, a second mixer 24, a set of code correlators 26, a microcomputer 28, a carrier numeric controlled oscillator (NCO) 30, a local code generator 32 and a code numeric controlled oscillator (NCO) 34. A spectral line tracker 36 includes a spectral line carrier mixer 38, a set of spectral line correlators 40, a spectral line carrier numeric controlled oscillator (NCO) 42 and shares the microcomputer 28. All-digital baseband correlation processing of GPS signals is described by, P. Ould and J. VanWechel, in "All-Digital GPS Receiver Mechanization", Papers Published in Navigation, Vol. 2, 1984, pp. 25-35, by the Institute of Navigation (Washington, DC). Although only one spectral line tracker 36 is shown as included in the receiver 10, several such trackers are preferred, in order to track more than one spectral line at a time.

In operation, orbiting navigation satellites, represented by a satellite 44, provide spread-spectrum microwave radio signals that are received by the antenna 12 and then amplified and downconverted in frequency by the RF downconverter 14. The signal is then sampled and digitized by the sampler 20. The radio carrier is removed from the incoming signal by the first mixer 22 with a locally generated carrier frequency from NCO 30. The modulation code is removed by the second mixer 24 with a locally generated representation of the C/A-code of the particular satellite 44 from code generator 32. The signal is then fed into the digital correlators 26 for tracking. The microprocessor 28 reads the correlator outputs, typically at a one kilohertz rate, and forms code and carrier phase error estimates which are then filtered and fed back. The correction values are applied to the code and carrier NCO's 34 and 30 to keep the local code and carrier representations in phase with the satellite signal. Conventional GPS receivers receive signals as a composite of the complete spectrum, and do not access individual spectral lines associated with the signal from the satellite 44.

The digitally sampled representations of the incoming signals 18 and 19 are applied to all of the spectral line trackers (1 ... n) 36. A frequency aiding term $F_{aid}(n)$ is developed by the microprocessor 28 and applied to each of the spectral line trackers 36.

Figure 1:
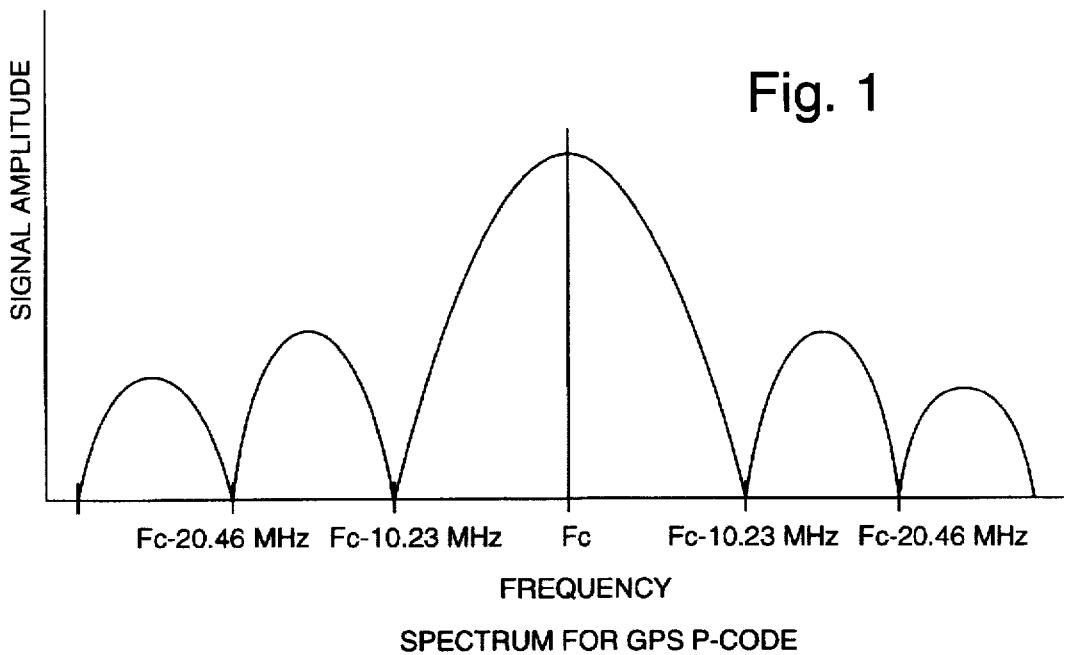
FIG. 1 is a diagram of a frequency spectrum for GPS P-code transmitted from a navigation satellite.
Figure 2:
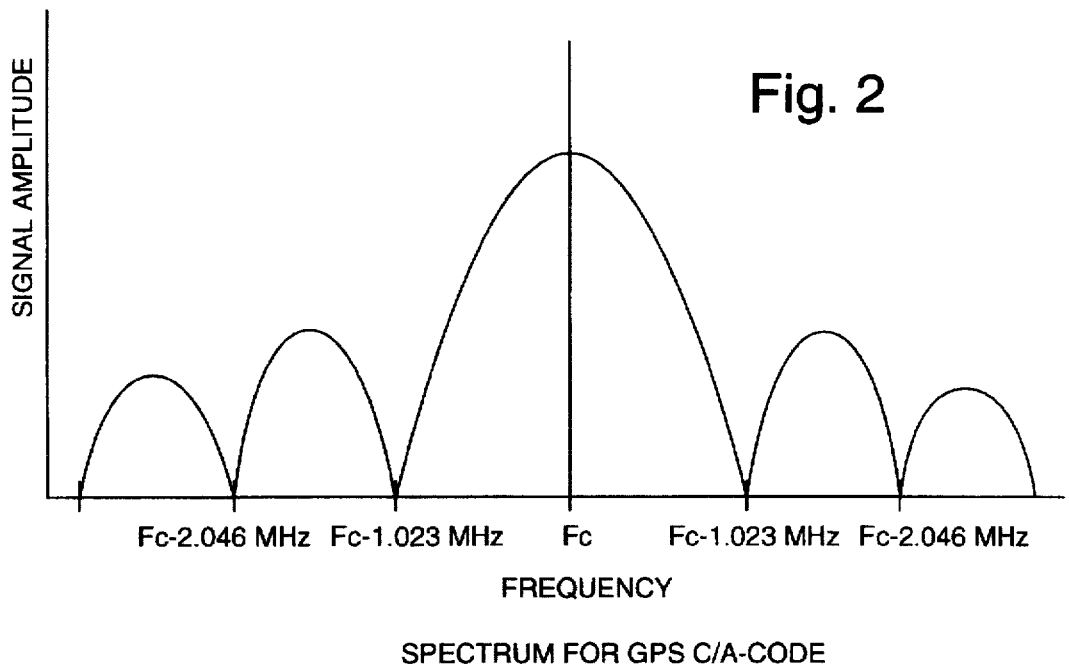
FIG. 2 is a diagram of a frequency spectrum for GPS C/A-code transmitted from a navigation satellite.
Figure 3:
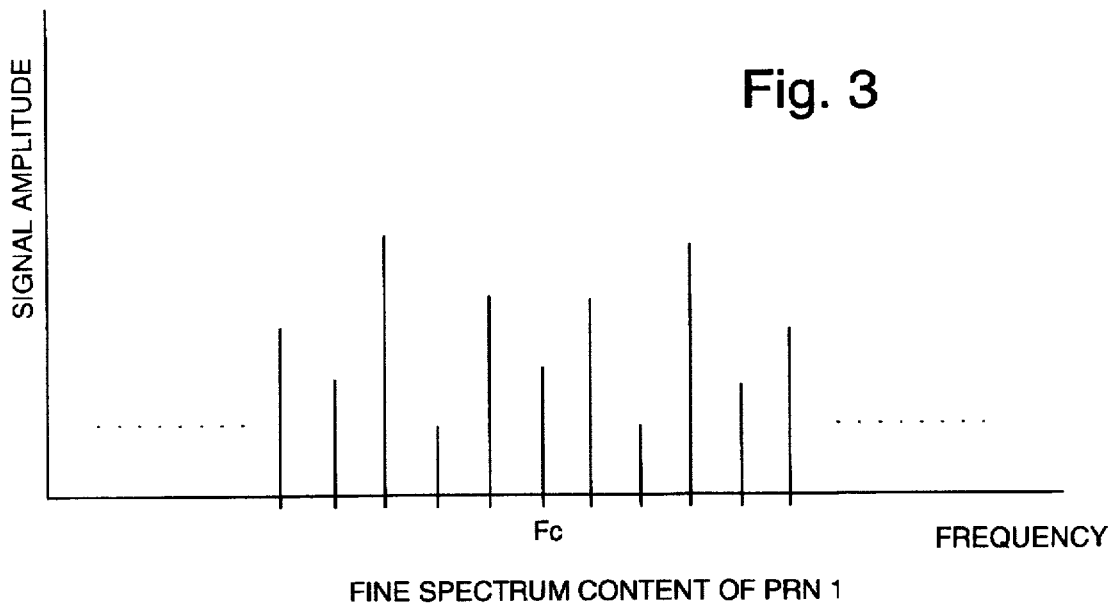
FIG. 3 is a diagram of the fine frequency spectrum for GPS C/A-code, PRN 1, transmitted from a navigation satellite.
Figure 4:
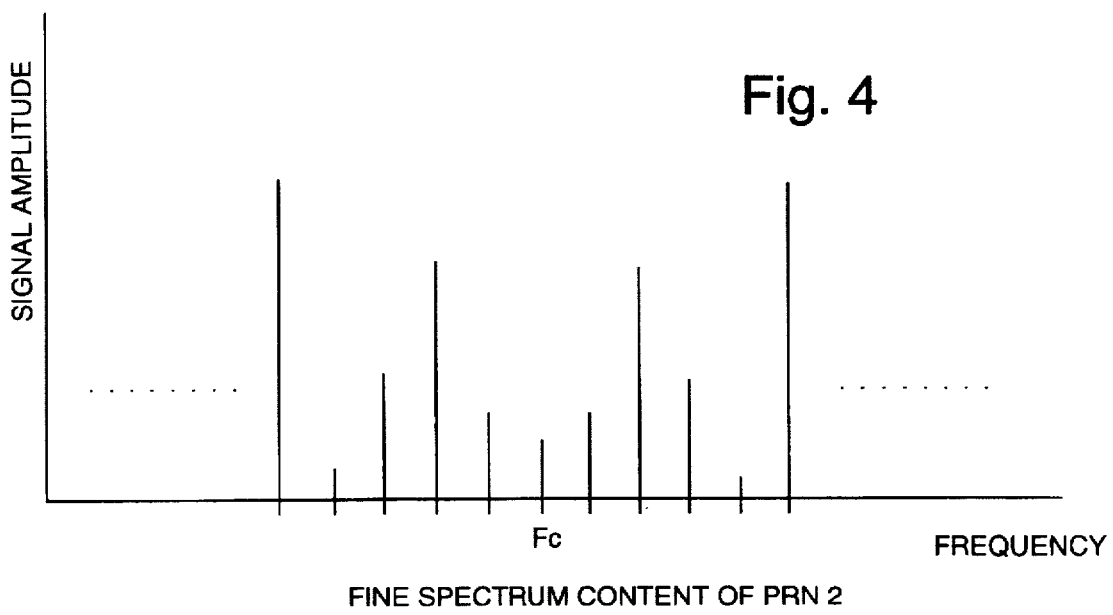
FIG. 4 is a diagram of the fine frequency spectrum for GPS C/A-code, PRN 2, transmitted from a navigation satellite.

All signals, including spectral lines, generated by the navigation satellite 44 are coherent to each other because they are all derived from a single master oscillator on the satellite. Therefore, in the absence of any distorting effects, there exists an exact relationship between the center carrier frequency (Wc) and the several spectral line components, e.g., FIGS. 3 and 4. This relationship is mathematically represented as, $$Wn = Wc + (n \times 1.0 \text{ kilohertz}), \quad (2)$$

where, Wn=frequency of $n^{th}$ spectral line,

Wc=center carrier frequency (1575.42 MHz for GPS L1), and n=integer spectral line offset from center.

In practice, the carrier frequency term important to tracking and measurements in a conventional GPS receiver is that which is applied to the carrier NCO 30. The carrier NCO 30 operates after the signal from the satellite 44 is downconverted and operates at a frequency which is, in general, much lower than the microwave carrier frequency transmitted by the satellite 44. A final intermediate frequency (IF) is 420 KHz. The carrier NCO 30 produces a signal output with a frequency that. facilitates carrier phase lock tracking, $$F_{cnco} = \text{final IF} + Fd + Fu, \quad (3)$$

where, $F_{cnco}$=frequency at output of carrier NCO, final IF=pre-sampling IF of incoming signal, Fd=Doppler frequency offset due to relative user/satellite motion, and Fu=Receiver master clock frequency offset.

The output of the carrier NCO 30 is, $$F_{cnco} = W \times F_{clock}/2^N, \quad (4)$$

where, $F_{cnco}$=frequency at output of carrier NCO 30,

W=numerical word applied to carrier NCO 30 input, $F_{clock}$=clock frequency driving carrier NCO 30, and N=length of carrier NCO in bits.

If the spectral line to track is n=5 (e.g., 5.0 KHz above the center frequency) and the final IF=420 KHz, then from equations (3) and (4), $$F_{cnco}(n=5)=\text{final } IF+Fd+Fu=F_{cnco}+5.0 \text{ KHz} \quad (5)$$

where, $F_{cnc}(n=5)$=exact frequency of fifth tone, and
$F_{cnco}$=frequency output of the carrier NCO 30.

In order to provide an exact frequency for the spectral tracker carrier NCO 42, equations (4) and (5) are combined and rearranged, $$W_{snco}=(W_{cnco} \times F_{clock}/2^N+5.0 \text{ kilohertz}) \times 2^M/F_{clock} \quad (6)$$

where, $W_{snco}$=frequency word applied to spectral tracker carrier NCO 42, $F_{clock}$=driving clock of the carrier NCO 30, and spectral line NCO 42

N=length in bits of the carrier NCO 30, and

M=length in bits of spectral tracker carrier NCO 42.

Conventional digital trackers can provide an exact frequency term which can be applied to the spectral tracker carrier NCO 42 to frequency-lock to a spectral line of interest. In practice, the frequency aiding of the spectral tracking carrier NCO 42 by the carrier NCO 30 is computed by the microcomputer 28 and by applying a new $W_{snco}$ value every time a $W_{cnco}$ value is computed and applied.

In order to perform accurate carrier phase measurements on a spectral line, it is preferable to both phase-lock and frequency-lock to the spectral line of interest. Frequency aiding from microcomputer 28 in locking NCO 30 provides the frequency lock. The spectral line tracker 36 generates two correlation sums, in-phase and quadrature (I and Q). An estimate of the phase between the locally generated carrier NCO 42 and the spectral line of interest is generated with conventional I and Q phase-lock techniques, e.g., carrier phase error=arctan (Q/I). This phase error is filtered before being fed back to spectral line NCO 42 to form a closed feedback loop with the microcomputer 28 to drive any phase error to zero. When the spectral line NCO 42 is phase-locked with the selected spectral line, the numeric value is used as a measure of the carrier phase of the spectral line. The microprocessor reads spectral line NCO 42 output word at the measurement time, "tm". This represents the carrier phase measurement "Pn", in equation (1). The amplitude of the spectral line, "An", in equation (1), is simply the I-correlator output magnitude. Thus a measurement description of each spectral line can be developed via the spectral tracker 36.

The spectral lines are significantly lower in power with respect to a composite navigation satellite's signal, typically 24–30 dB below the power level a conventional GPS C/A code tracker would be provided. In a conventional GPS code tracker, the bandwidth associated with the carrier tracking loop must allow for the expected dynamics between receiver and satellite, and also for receiver clock acceleration. This usually results in a carrier tracking loop bandwidth of greater than or equal to ten hertz. The carrier tracking loop of the spectral tracker 36 would not operate at such a bandwidth, as there is insufficient power available in a spectral line. The carrier tracking loop of spectral tracker 36 does not have to track the receiver or satellite dynamics, or receiver clock acceleration, because this information has been provided to its carrier tracking loop by the frequency aiding procedure. The carrier loop bandwidth in the spectral line tracker 36 need only be sufficient to track any ionospheric acceleration between the desired spectral tone and the center frequency (Wc). This frequency difference is typically small, less than a few megahertz. So the relative ionospheric acceleration between the two signals will also be small. A spectral tracker carrier loop bandwidth of 0.05 hertz is sufficient to facilitate tracking of the spectral lines.

A combined hardware/software technique is preferably used which allows tracking of any of the one kilohertz separated spectral lines present in a GPS C/A-code frequency spectrum. Measurements allow each of the spectral lines to be completely characterized, e.g., it, amplitude and phase information, as in equation (1). The receiver 10 is able to produce, pseudo range measurement and carrier phase measurements from conventional GPS C/A-code tracking, and spectral line amplitude measurement and carrier phase measurement from the spectral tracker 36 tracking the $n^{th}$ spectral line.

Figure 6:
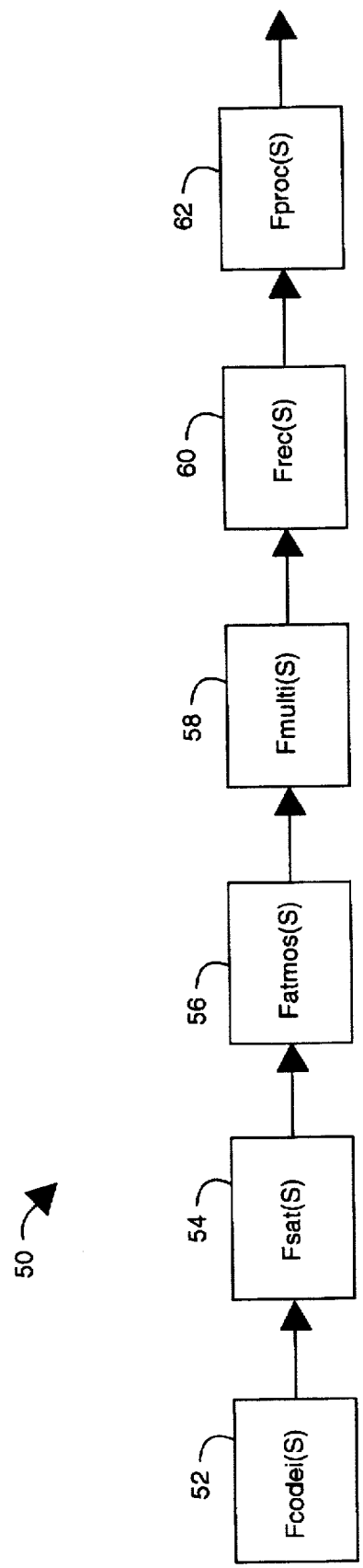
FIG. 6 is a diagram of a transfer function for the navigation satellite signal path between satellite signal generation and receiver measurement.

FIG. 6 shows a transfer function 50 for the navigation satellite signal path between satellite signal generation and receiver measurement. A function 52, Fcodei(s), is the transfer function of the particular C/A-code that an $i^{th}$ satellite, satellite 44, will transmit. Each C/A-code consists of a known 1,023-bit sequence of ones and zeros. A Fourier transformation of this sequence from the time domain to the frequency domain provides its distortion-free frequency transfer function. A function 54, Fsat(S), is the transfer function of the satellite's combined filters, amplifiers and other active and non-active components. This may be obtained from the satellite manufacturer prior to launch, or it may be derived empirically through observation of the satellite from a ground station after launch. This empirical observation includes the use of a high gain wideband receiver mechanism and a spectrum analyzer. A high gain antenna allows the spectrum to be observed in the presence of noise, and a wideband receiver chain provides for minimum distortion of the observed signal, although any receiver chain induced distortion may be theoretically removed if its transfer function is known. The satellite generated C/A-code signal may be observed to the extent that its individual spectral lines are apparent. A function 56, Fatmos(S), represents the transfer function of atmospheric distortions due to ionospheric and tropospheric effects that the signal encounters between the satellite and the receiver 10. A function 58, Fmulti(S), represents the transfer function of the distortion due to multipath, e.g., signals reflected from objects surrounding the receiver antenna 12 or the transmitter antenna on the satellite 44. A function 60, Frec(S), represents the transfer function of the filters, amplifiers and other active and non-active components Of the receiver 10, before the signal is detected. A function 62, Fproc(S), represents the transfer function of the processing of the receiver 10 between signal detection and measurement output. The spectral content of a GPS satellite and its effect on the final measurement result may therefore be represented by, $$Fsystem(S)=Fcodei(S) \times Fsat(S) \times Fatmos(S) \times Frec(S) \times Fproc(S) \quad (7)$$

This calculation may be performed on the entire signal spectrum, or on individual spectral lines, with the entire signal spectrum affecting the conventional parts of the receiver 10, and individual spectral lines affecting the spectral line tracker 36.

Figure 7:
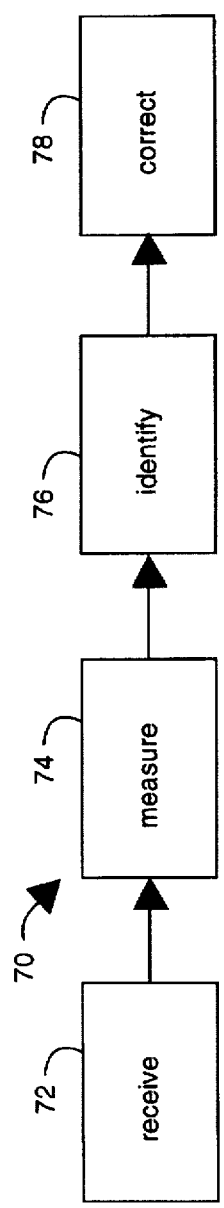
FIG. 7 is a diagram of a method of the present invention for correcting distortions in spread spectrum radio transmissions from orbiting navigation satellites.

FIG. 7 illustrates a method 70 for correcting distortions in spread spectrum radio transmissions from orbiting navigation satellites, e.g., satellite 44. The method 70 comprises a step 72 for receiving radio transmissions from orbiting navigation satellites, e.g., satellite 44, with the receiver 10. A step 74 measures the amplitude and phase of individual spectral lines of energy which are constituent to the modulated double-sideband-with-carrier envelope in the radio transmissions. A step 76 identifies individual ones of the orbiting navigation satellites, e.g., satellite 44, by its C/A-code sequence. A step 78 corrects the amplitude and phase of the radio transmissions received according to a comparison of amplitude and phase measurements between measurements obtained in the step of measuring with a template for an ideal distortion-free representation of a radio carrier modulated by the C/A-code sequence for the orbiting navigation satellite identified in the step of identifying.

Figure 8:
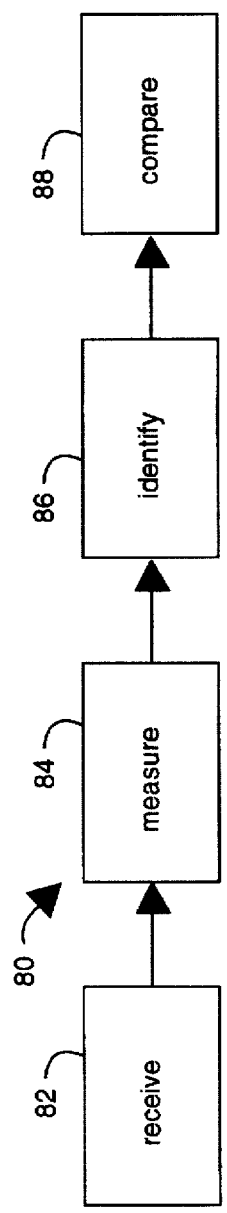
FIG. 8 is a diagram of a method of the present invention for determining ionospheric delays from a single spread-spectrum radio transmission from orbiting navigation satellites.

FIG. 8 illustrates a method 80 for determining ionospheric delays from a single spread spectrum radio transmission from orbiting navigation satellites, e.g., satellite 44. A step 82 receives radio transmissions from the orbiting navigation satellites, e.g., satellite 44, with the receiver 10. A step 84 measures the amplitude and phase of individual spectral lines of energy which are constituent to the modulated double-sideband-with-carrier envelope in the radio transmissions. A step 86 identifies individual ones of the orbiting navigation satellites, e.g., satellite 44, by its C/A-code sequence. A step 88 compares the phase relation between individual spectral line of energy measurements obtained in the step of measuring and determining therefrom an estimate of an ionospheric delay between the orbiting navigation satellites, e.g., satellite 44, and the receiver.

Figure 9:
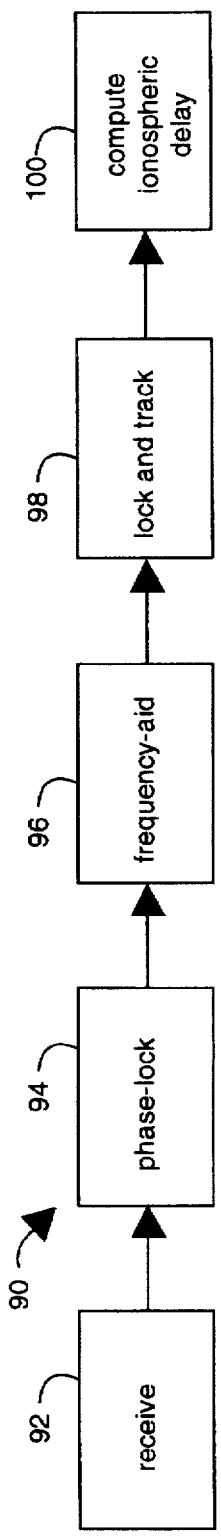
FIG. 9 is a diagram of a method of the present invention for tracking individual spectral lines of energy in a spread spectrum modulated radio carrier transmission from orbiting navigation satellites.

FIG. 9 illustrates a method 90 for tracking individual spectral lines of energy in a spread spectrum modulated radio carrier transmission from orbiting navigation satellites, e.g., satellite 44. A step 92 receives radio transmissions from the orbiting navigation satellites, e.g., satellite 44, with the receiver 10. A step 94 is for phase-locking a first local oscillator to the radio carrier transmission at a frequency "$F_c$" obtained in the step of receiving. A step 96 is for frequency-aiding a second local oscillator to phase lock, in a step 98, on a single one of the individual spectral lines of energy with a signal derived from the first local oscillator. A further step 100, computes ionospheric delays from the difference in phase of separately measured spectral lines, e.g., widely separately from opposite sides of the carrier frequency. The method 100 is therefore a method of computing ionospheric delays in a single frequency, e.g., an L1-only, receiver.

The frequency difference between adjacent spectral lines, or tones, which are typically one kilohertz apart, has a wavelength of three hundred kilometers. The wavelength of the frequency difference between carriers L1 and L2 is eighty-six centimeters, and is conventionally used in "wide-lane" technique to aid carrier phase integer ambiguity resolution. The C/A-code phase provides only a rough estimate of the position of the receiver 10. The wavelength of the difference in spectral line tone frequencies makes it possible to use the receiver 10 to quickly and unambiguously resolve integer ambiguities. For example, the microcomputer 28 is used to determine the phase difference between tones one kilohertz apart. The difference will rotate through zero every three hundred kilometers in range from the satellite 44. The microcomputer 28 is then used to determine the phase difference between tones two kilohertz apart. The difference will rotate through zero every one hundred and fifty kilometers in range from the satellite 44. At its finest resolution of range by carrier phase, the microcomputer 28 is used to determine the phase angle of the L1-carrier, which will rotate through zero phase angle every nineteen centimeters in range from the satellite 44. The accumulation of the various measurements is used simultaneously to provide a unique solution.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method (70) for correcting distortions in spread-spectrum radio transmissions from orbiting navigation satellites, the method comprising the steps of:

receiving (72) radio transmissions from said orbiting navigation satellites with a navigation receiver;

measuring (74) the amplitude and phase of a plurality of individual spectral lines of energy which are constituent to a modulated double-sideband-with-carrier envelope in said radio transmissions;

identifying (76) an individual one of said orbiting navigation satellites by its C/A-code sequence; and correcting (78) the amplitude and phase of said radio transmissions received according to a comparison of amplitude and phase measurements between measurements obtained in the step of measuring with a template for an ideal distortion-free representation of a radio carrier modulated by said C/A-code sequence for said orbiting navigation satellite identified in the step of identifying.

2. A method (80) for determining ionospheric delays from a single spread-spectrum radio transmission from orbiting navigation satellites, the method comprising the steps of:

receiving (82) radio transmissions from said orbiting navigation satellites with a navigation receiver;

measuring (84) the amplitude and phase of individual spectral lines of energy which are constituent to the modulated double-sideband-with-carrier envelope in said radio transmissions;

identifying (86) an individual one of said orbiting navigation satellites by its C/A-code sequence; and comparing (88) the phase relation between individual spectral line of energy measurements obtained in the step of measuring and determining therefrom an estimate of an ionospheric delay between said orbiting navigation satellites and said receiver.

3. A method (90) for tracking individual spectral lines of energy in a spread-spectrum modulated radio carrier transmission from orbiting navigation satellites, the method comprising the steps of:

receiving (92) radio transmissions from said orbiting navigation satellites with a navigation receiver;

phase-locking (94) a first local oscillator to said radio carrier transmission at a frequency "$F_c$" obtained in the step of receiving; and frequency-aiding (96) a second local oscillator to phase-lock on a single one of said individual spectral lines of energy with a signal derived from said first local oscillator.

4. The method of claim 3, further comprising the step of:

computing (100) ionospheric delays from a difference in phase of separately-measured said spectral lines.

5. An improved navigation satellite receiver (10) for tracking individual spread-spectrum frequency spectral lines with a microwave receiver antenna to receive signals from orbiting navigation satellites, a downconverter to produce in-phase and quadrature (I and Q) signals from said received satellite signals, and a digital processing system for frequency and phase-locking a plurality of numeric controlled oscillators (NCO) (30, 34) to the carrier and code of said satellite signals, the improvement comprising:

at least one spectral line tracker (36) connected to receive said (I and Q) signals and including a spectral line numeric controlled oscillator (NCO) (42) connected to a spectral line mixer (38) that drives a spectral line code correlator (40), wherein the spectral line NCO is frequency-aided to frequency lock on a spectral line from a value obtained from said carrier NCO (30).

6. The receiver of claim 5, wherein:

said carrier NCO (30) is included in a carrier tracking loop with a bandwidth of approximately ten hertz; and said spectral line NCO (42) is included in a carrier tracking loop with a bandwidth of approximately 0.05 Hz.

7. The receiver of claim 5, further comprising:

a microcomputer (28) connected to a code correlator (26) driven by the carrier and code NCO's (30, 34) and to said spectral line code correlator (40) and including integer ambiguity resolution means for comparing the phases of adjacent spectral lines one kilohertz apart to resolve said receiver's position in a three hundred kilometer range from said orbiting navigation satellites.

8. The receiver of claim 7, wherein:

the microcomputer (28) further includes means for comparing the phases of spectral lines two kilohertz apart to resolve said receiver's position in a one hundred and fifty kilometer range from said orbiting navigation satellites.

9. The receiver of claim 5, further comprising:

a microcomputer (28) connected to a code correlator (26) driven by the carrier and code NCO's (30, 34) and to said spectral line code correlator (40) and including integer ambiguity resolution means for measuring the phases of a plurality of pairs of spectral lines with varying discrete frequency separations to resolve said receiver's position in range from each of said orbiting navigation satellites by simultaneous solution of a plurality of said measurements, wherein carrier phase integer ambiguity is overcome.

* * * * *